May 22, 1934.  W. J. IRWIN  1,959,828
MEAT TENDERING APPARATUS
Filed Aug. 15, 1930  2 Sheets-Sheet 2
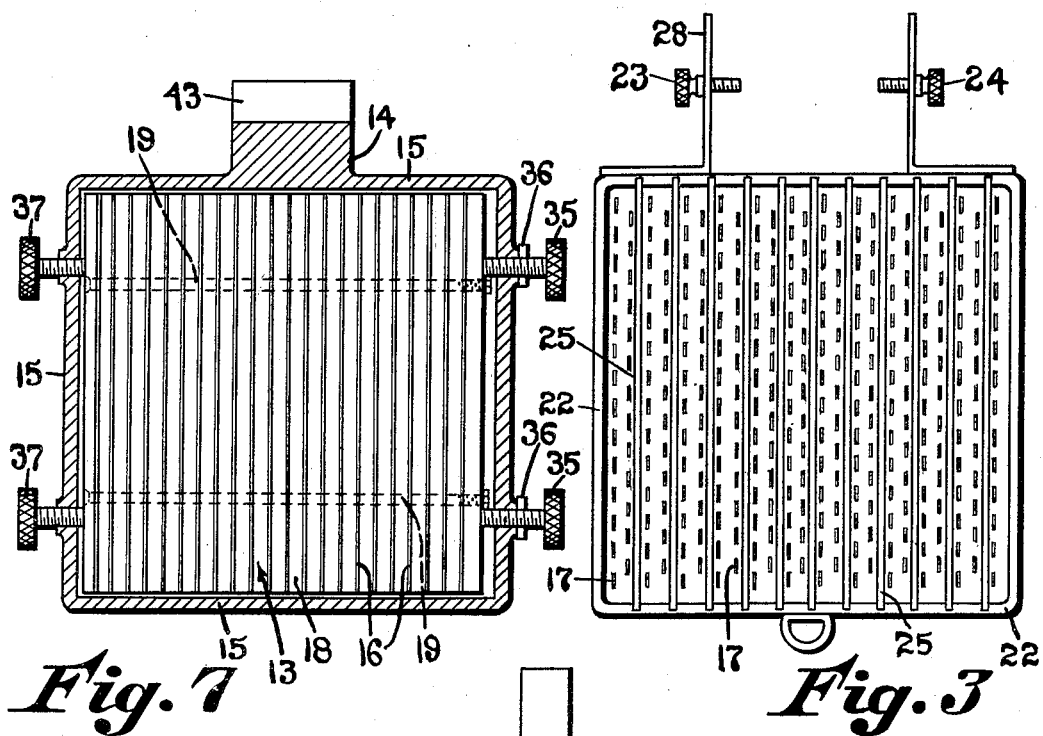
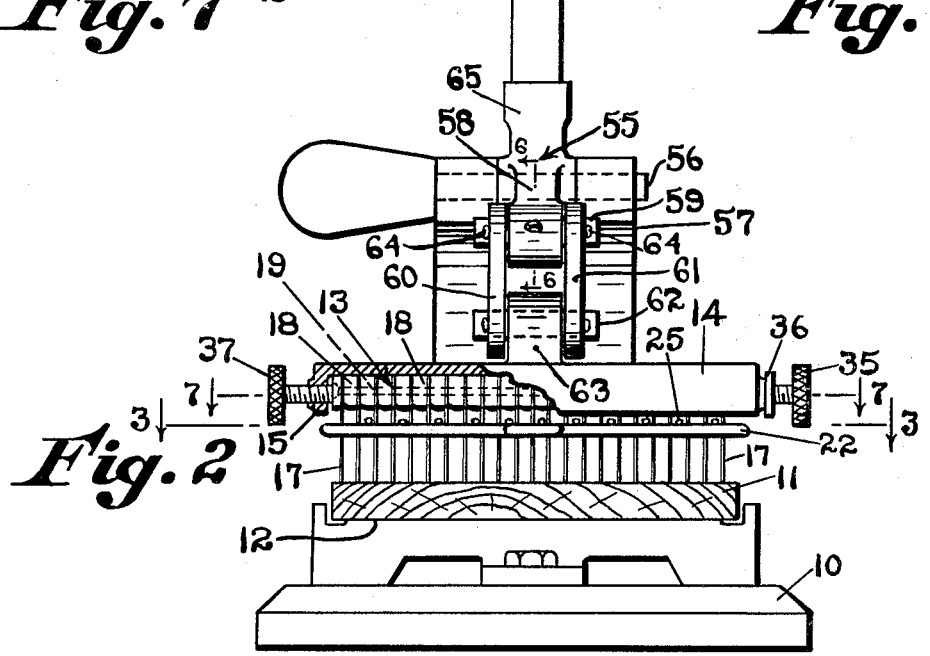
WITNESS
Harold W. Eaton
INVENTOR
William J. Irwin
BY Clayton R. Jenks
ATTORNEY Patented May 22, 1934

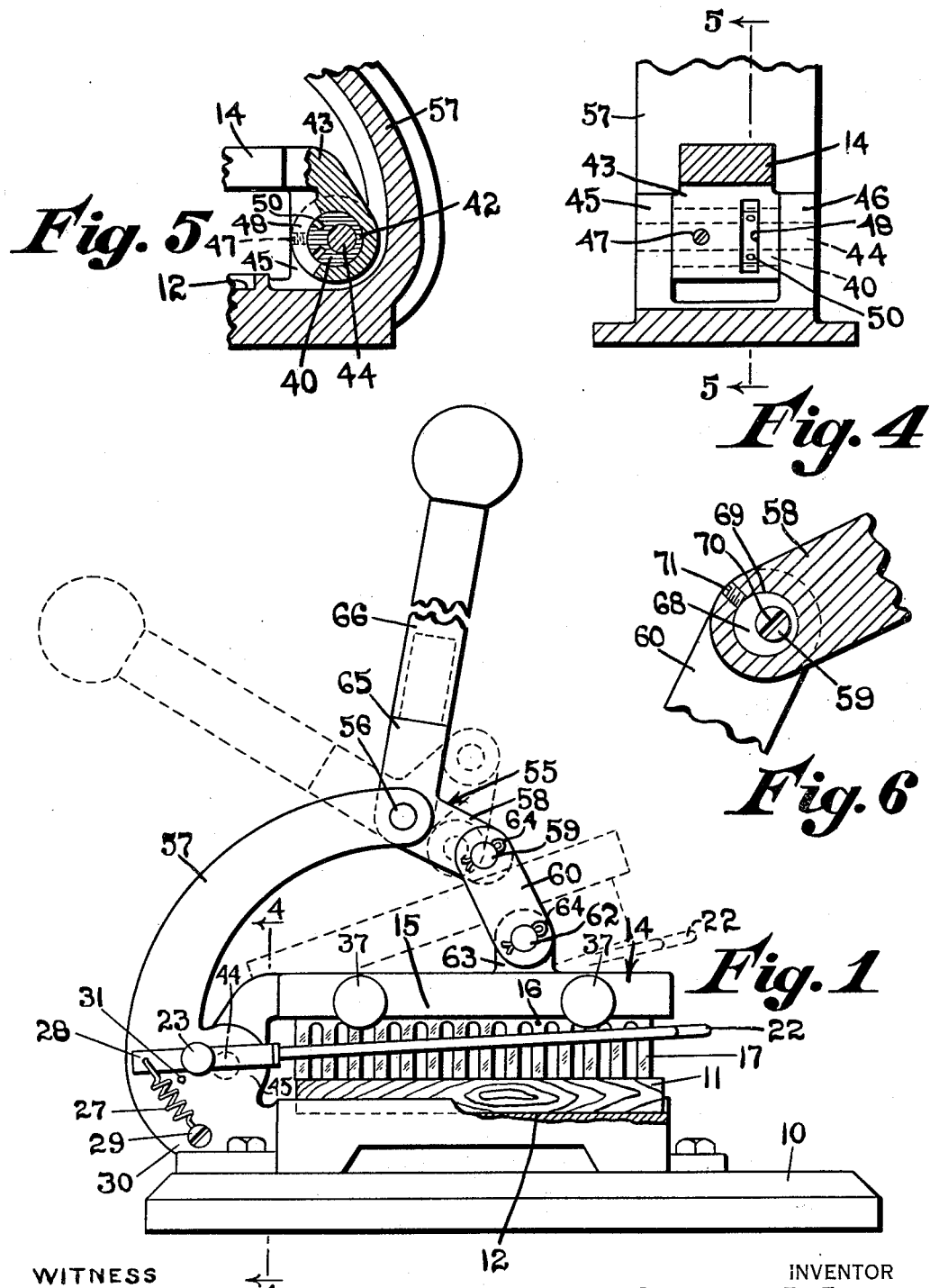

1,959,828

UNITED STATES PATENT OFFICE 1,959,828

MEAT-TENDERING APPARATUS

William J. Irwin, Medford, Mass., assignor, by mesne assignments, to Norton Pike Company, Worcester, Mass., a corporation of Massachusetts Application August 15, 1930, Serial No. 475,418

14 Claims. (Cl. 17—25)

This invention relates to a cutting machine and more particularly to a machine for tendering sliced meat, such as steaks and the like.

Heretofore various kinds of apparatus have been devised for tendering meat, which have involved the use of rotary knives rolled across the meat or a bank of knives arranged in a lemon squeezer type of apparatus forced directly through the piece of meat. In many of the previous devices, the blades have been so arranged that they cut only in one direction and a part of the fibres remain uncut, or, as is the case where continuous knives are rolled across the meat, the slice is not cut entirely through and a tough layer remains adjacent one surface. A further serious defect in such constructions has resided in the fact that the blades could not be adjusted to new positions as they wore away.

It is the primary object of this invention to overcome such difficulties and to provide a meat tendering apparatus which is simple in its construction and may be easily operated and kept in proper condition for efficient use.

It is a further object of this invention to provide a device of this type in which the blades may be forced through the meat to cut the fibres completely, and preferably in a plurality of directions so that the tough fibres may be severed into small lengths.

Another object of this invention is to provide a suitable compound lever mechanism which enables the operator to force the knife blades with ease through a tough piece of meat.

It is another object of this invention to provide a suitable guard which prevents the operator's hand from contacting with the front edges of the cutting blades when in a raised position.

It is still another object of this invention to provide a cutter block made up of a plurality of spaced blades which is so constructed that the blades may be readily assembled as well as taken apart when it is desired to replace a blade.

It is a further object of this invention to provide suitable clamping and positioning means so that the cutter block may be readily aligned with a stripper and may be also readily removed from the apparatus for cleaning and sharpening.

A still further object is to provide such a device with adjustable parts which enable the operator to position the knives correctly relative to a platen and to readjust them when they have been shortened by a sharpening operation.

With these and other objects in view as will be apparent to one skilled in the art, this invention resides in the combination of parts set forth in the specification and covered by the claims appended hereto.

One embodiment of this invention has been illustrated in the accompanying drawings, in which like reference numerals indicate like parts:

Fig. 1 is a side elevation partly in section of this apparatus with the cutting knives in an operative position, and also showing in dotted lines the cutter support and lever mechanism in a raised or open position;

Fig. 2 is a front elevation partly in section of the device showing the parts in a position similar to that shown in Fig. 1;

Fig. 3 is a fragmentary sectional view taken approximately on the line 3—3 of Fig. 2 to show the arrangement of the cutting blades;

Fig. 4 is a fragmentary cross sectional view of the adjustable pivot for the cutter support taken approximately on the line 4—4 of Fig. 1;

Fig. 5 is a cross sectional view of the parts taken approximately on the line 5—5 of Fig. 4;

Fig. 6 is a fragmentary sectional view on an enlarged scale of the adjustable pivot in the lever mechanism, taken approximately on line 6—6 of Fig. 2; and Fig. 7 is a cross sectional view taken approximately on the line 7—7 of Fig. 2 showing in detail the clamping and adjusting means for the cutter block.

As illustrated in the drawings, this apparatus comprises a base 10 which is arranged to support a removable meat supporting wooden platen 11 in a recessed portion 12 of the base. This platen and the recess are preferaby square so that the platen may be turned through 90° whereby the meat may be cut in two directions. The recess and platen may of course be otherwise shaped to permit cutting the meat in several directions. Pivotally mounted above the base is a cutter block 13 carried in a support 14. The support 14 is arranged to swing toward and from the platen to force a plurality of knife blades of the cutter block through the meat being tendered. The support 14 is preferably provided with a downwardly extending flange 15 around its edge to form a box-like recess to receive the cutter block.

The cutter block 13 is preferably composed of a plurality of spaced blade sections 16 which are made of a thin wafer blade construction, each section being slotted at its lower end to provide a plurality of cutting blades 17 spaced apart at their operative edges. Alternate blades have their cutting edges staggered as shown in Fig. 3 so that it will be impossible to cut the meat into separate pieces even when the meat is turned through 90° for making a second cut. The blade sections are spaced by metal strips 18 and the entire unit is rigidly held together by bolts 19 to form a unitary cutter block which may be readily handled for sharpening the cutting edges and may be removably and adjustably placed within the apparatus as a unit. The bolts 19 serve to removably clamp the blades and the spacer strips 18 in position. Removal of the bolts 19 permits the block to be taken apart and the individual blades replaced.

A suitable stripper is pivotally mounted on the base by means of pivot screws 23 and 24. The stripper comprises a substantially square shaped frame 22 having spaced cross ribs 25 extending in the spaces between alternate knife blade sections. This serves to strip the meat from the cutting blades 17 after they have been forced through the meat. A spring 27 is connected between the end of the stripper arm 28 and a pin 29 on a projection 30 of the base to normally maintain the stripper in a raised position. A stop pin 31 is provided to limit the upward movement of the stripper so that, when the cutter is in a raised position, the stripper 22 is stopped slightly below the front edges of the cutter blades (as indicated in dotted lines in Fig. 1) to serve as a guard and prevent the operator's hand from engaging the edges of the blades. The stripper may be held down by hand when the blades are raised so as to strip the meat from the blades.

In the preferred construction, a suitable clamping and aligning mechanism is provided on the support 14 so that the cutter block 13 may be removably clamped in place therein and adjusted or aligned so that the blades 16 clear the ribs 25 of the stripper. A pair of screws 35 are provided on one side 15 of the support 14 to serve as stops to align the cutter block. These screws are provided with lock nuts 36 so that when once adjusted, the lock nut may be tightened to hold the screws in their adjusted position. The cutter block 13 may then be inserted in place with one edge in contact with the stop screws 35. A second pair of screws 37 on the opposite side 15 of the support 14 may be adjusted to clamp the cutter block in place on the support. It will be readily appreciated from this disclosure that by use of this clamping and adjusting device, the operator may readily remove the cutter block when the blades become dull or when it is desired to clean the machine after use and then insert the cutter block in place ready for use.

It is highly desirable in an apparatus of this type that all of the cutting blades 17 be maintained in the same plane and that they contact evenly with the meat supporting platen 11 when forced through the meat. To this end, a suitable adjusting device is provided, and it preferably comprises an eccentric bushing 40 mounted in a projection 43 of the cutter block support 14. The bushing 40 is loosely mounted in an aperture 42 in an enlarged projection 43 of the support. The bushing 40 is supported on a stud 44 which is journaled in the ears 45 and 46 formed as integral projections of the base. By adjusting the eccentric bushing relative to the pivot pin, the pivot end of the support may be raised or lowered as desired to align the blades 17 with the platen 11. In other words, if the end blades of the cutter block, adjacent to the pivot, contact with the platen and the blades at the opposite end are slightly raised therefrom, then the operator may turn the eccentric bushing 40 to raise the pivot point of the support 14 so as to bring the blades at the outer end of the block into contact with the platen when in a lower position so that all of the blades will contact evenly with the platen and cut entirey through the piece of meat being tendered.

The bushing 40 is held in adjusted position by means of a set screw 47 which permits the bushing to be locked to the projection 43 of the support 14. The projection 43 is provided with an elongated slot 48 so that the bushing 40 may be readily adjusted after the screw 47 has been loosened by inserting a tool in the holes 50 in the bushing.

To attain a further object of this invention, namely to provide a suitable mechanism whereby the blades may be forced readily through a tough slice of meat, a compound lever mechanism is provided so that the operator may with ease accomplish the desired result. This mechanism may comprise a bell crank lever 55 pivotally supported by a pin 56 on a projection 57 on the base of the machine. The bell crank has a short arm 58 which is connected by a pin 59 to a pair of links 60 and 61 which are in turn connected by a pivot pin 62 supported in a projection 63 of the cutter block support. The links 60 and 61 are loosely fitted on the pins 59 and 62, and are held in position thereon by cotter pins 64. The other arm 65 of the bell crank lever 55 is provided with a removable handle 66. By manipulation of the handle 66, the bell crank lever 55 may be rocked to swing the cutter support 14 and force the blades 17 through the meat being tendered. The upper end of the handle 66 is weighted so that the cutter and blades are normally held in an inoperative position remote from the platen, when not being operated to cut a piece of meat.

The bell crank lever and linkage mechanism is preferably arranged so that when the blades 17 contact with the platen 11, the short arm 58 of the bell crank 55 and the links 60 and 61 nearly approach a straight line. This arrangement of parts gives a toggle action which enables the blades to be forced through the meat with a minimum amount of effort on the part of the operator.

Due to wear of the parts and also to the wearing away of the blades caused by sharpening, it is desirable that a suitable adjustment be provided so that the effective length of the parts may be varied to compensate for wear. To accomplish this result, the pin 59 (Fig. 6) is provided with an enlarged eccentric portion 68 which fits within an aperture 69 in the lower end of arm 58. It will be readily appreciated that rotation of the pin 59 will shorten or lengthen the effective length of the arm 58 of the bell crank 55. The pin 59 is provided with a slot 70 in its end so that it may be readily turned by means of a screw driver. The eccentric portion 68 and the pin 59 may be locked in adjusted position relative to arm 58 by means of a set screw 71. This construction is such that the blades cannot be moved towards the base beyond a definite position; hence if the wooden platen were absent the blades could not come into contact accidentally with the metal base.

It will be readily appreciated that by providing a plurality of spaced blade sections, each having spaced cutting blades, and staggering the cutting edges of adjacent blades, that the long fibres or sinews in the slice of meat will be cut into short lengths. Since the platen 11 is square shaped, it may be removed with the meat thereon and turned through 90° and replaced, whereby a similar cutting may be accomplished at right angles to the first cut so that the fibres or sinews may be cut into shorter lengths. This operation, however, does not sever the meat into cubes but leaves it in an integral slotted condition so that it will hold together during the cooking operation.

Having thus described my invention, what I claim as new and desire to secure by Letters Patent is:

1. A meat tendering apparatus comprising a base, a meat platen thereon, a cutter support pivotally fastened at one side to said base, a block of wafer-like cutter blades on said support which have elongated sharp edges, adjustable means for aligning both ends of the blades relative to the platen, a stripper arranged to remove the meat from the blades when the latter are moved upwardly, and means including a manually operable lever mounted on the base and connections between the lever and the support for moving the blades downwardly to cut entirely through the meat but not beyond a limiting position of alignment with the platen.

2. A meat tendering apparatus comprising a base, a meat platen thereon, a cutter support pivotally fastened at one side of said base, a block of wafer-like cutter blades on said support which have elongated, sharp edges aligned with the platen, a stripper arranged to remove the meat from the blades when the latter are moved purposely, an arm mounted on the base, a weighted lever pivoted thereon, and an actuator link between the lever and the cutter support which forms a toggle for moving the blades to a predetermined position, said lever being so arranged that the blades tend to stay in an inoperative position away from the platen.

3. A meat tenderer comprising a base, a cutter support pivotally mounted on the base and having a peripheral member, a cutter block having a plurality of spaced cutter blades and means rigidly securing them together for removal as a unit, a stripper comprising members locatable between said blades and means for removably and adjustably mounting the block on said cutter support within said peripheral member and for bodily moving the cutter block laterally to adjust it relative to the stripper members.

4. A meat tenderer comprising a base, a meat platen thereon, a cutter support, a block of cutter blades mounted on said support, a pivotal connection between said cutter support and the base, adjustable means for moving the axis of the pivot towards and from the base, an actuating lever pivotally mounted on the base and an adjustable connection between said lever and the cutter support, both of said adjustable parts being so arranged that both ends of the cutter block may be raised or lowered and the blades thereby adjusted into full contact with the platen.

5. A meat tenderer comprising a base, a meat platen thereon, a block of cutter blades for cutting meat on the platen, a pivot on the base for supporting one end of the block, an actuator handle movably mounted on the base, and an adjustable connection between the handle and the block for positioning the block relative to both the handle and the platen, said handle being so mounted and arranged that it cooperates with the pivot for supporting and raising the block and serves for manual movement of the blades towards the platen.

6. A meat tenderer of the type covered by claim 5 in which the adjustable connection between the lever and the block comprises an eccentric pin and means for rotatably adjusting the same.

7. A meat tenderer comprising a base, a removable wooden platen for supporting meat thereon, a block of narrow, short cutter blades arranged in rows and spaced laterally and longitudinally from one another, a pivotal connection between the block and the base, a handle for raising and lowering the block relative to the base, locating members on the base cooperating with the platen whereby the latter may be removably mounted on the base in either of two positions, means for adjusting both ends of all of the blades into alignment with the platen, and means for moving them downwardly to the limiting position of said adjustment, said rows of blades being staggered and arranged to cut entirely through the meat, when the platen is successively moved into both positions, without severing pieces of meat therefrom.

8. A meat tenderer comprising a frame, a platen thereon, a set of cutter blades pivoted on the frame and movable towards and from the platen, means for moving the blades upwardly to an inoperative position, a stripper guard for the blades pivotally mounted on the frame for movement with the blades during the cutting operation and for stripping the meat therefrom when the blades are raised, and means including a stop for moving the guard upwardly to a definite protective position adjacent to the front edges of the blades when they are raised, whereby contact with the blades by the operator's hand is prevented, said stop serving to limit the stripper movement and to cause it to remove the meat from the blades.

9. A meat tenderer comprising a base, a meat platen thereon, a pivotally mounted cutter block on said base and an adjustable eccentric bushing forming said pivot which is arranged so that the effective axis of the pivot may be raised or lowered to align the cutter blades so that they may contact evenly with the surface of said platen.

10. A meat tenderer comprising a base, a meat platen thereon, a movably mounted cutter support on said base, spaced cutter blades on said support, a stripper member having portions extending between some of said blades, a stop to limit the upward movement of said stripper and yieldable means tending to urge the stripper in an upward direction.

11. A meat tenderer comprising a base, a platen thereon, a movably mounted cutter support, a manually operable lever to move said support towards and from the base, a stripper interposed between the base and said support, a removable cutter block on said support having a plurality of spaced cutter blades, an adjustable locating stop on said support to align said blades relative to the stripper and clamping means on said support to clamp the cutter block in position thereon.

12. A meat tenderer comprising a base, a removable wooden platen for supporting meat thereon, a block of thin cutter blades arranged in rows and spaced laterally and longitudinally from one another, a pivotal connection between the block and the base, means including a handle pivoted to the base and a connection between the handle and the block which serves for raising the blades or for forcibly moving them downwardly to a limiting position relative to the platen, and locating means on the base cooperating with the platen whereby the latter may be located on the base in either of two positions, said rows of blades being staggered and arranged to cut entirely through the meat, when the platen is successively moved into both positions, without severing pieces of meat therefrom.

13. A meat tenderer comprising a frame, a platen for supporting meat thereon, a block of thin, spaced cutter blades pivoted on the frame and movable toward and from the platen, a stripper guard pivotally mounted on the frame, means associated with the guard to strip meat from the blades during raising thereof, and means including a handle pivotally mounted on the base and a link pivotally connecting said handle with said set of blades for raising and for moving the blades downwardly to a limiting position relative to the platen and base.

14. A meat tendering apparatus comprising a frame, a platen thereon, a block of thin, spaced cutter blades pivotally mounted on said frame and movable toward and from the platen, means including a pivotally mounted handle on the frame and a link connecting said handle and blades for moving the blades towards and from the platen to limiting positions, a stripper guard for the blades pivotally mounted on the frame for movement with the blades during the cutting operation and for stripping meat therefrom when the blades are raised to the upper limiting position, and means for moving the guard upwardly to a definite protective position when the blades are raised, whereby contact with the blades by the operator's hand is prevented.

WILLIAM J. IRWIN.